United States Patent
Deurenberg et al.

(10) Patent No.: US 7,990,083 B2
(45) Date of Patent: Aug. 2, 2011

(54) METHOD AND SYSTEM FOR VARIABLE COLOR LIGHTING

(75) Inventors: Peter Hubertus Franciscus Deurenberg, Eindhoven (NL); Eugen Jacob De Mol, Varginha (BR)

(73) Assignee: Koninklijke Philips Electronics N.V., Eindhoven (NL)

( * ) Notice: Subject to any disclaimer, the term of this patent is extended or adjusted under 35 U.S.C. 154(b) by 557 days.

(21) Appl. No.: 12/090,142

(22) PCT Filed: Oct. 6, 2006

(86) PCT No.: PCT/IB2006/053670
§ 371 (c)(1),
(2), (4) Date: Apr. 14, 2008

(87) PCT Pub. No.: WO2007/042984
PCT Pub. Date: Apr. 19, 2007

(65) Prior Publication Data
US 2008/0238339 A1    Oct. 2, 2008

(30) Foreign Application Priority Data

Oct. 13, 2005    (EP) ..................................... 05109506

(51) Int. Cl.
*H05B 37/00* (2006.01)
(52) U.S. Cl. ........ 315/318; 315/312; 315/294; 315/297; 345/83; 345/590; 345/600; 345/601; 345/690; 348/742
(58) Field of Classification Search .................. 315/307, 315/308, 312, 318, 316, 324, 294, 297; 345/82, 345/83, 77, 589–593, 600, 601, 690; 362/230, 362/231, 276; 250/205; 353/85, 121; 348/742
See application file for complete search history.

(56) References Cited

U.S. PATENT DOCUMENTS

| | | | | |
|---|---|---|---|---|
| 5,184,647 A * | 2/1993 | Goedecke et al. | ............ | 137/884 |
| 5,384,519 A * | 1/1995 | Gotoh | ............................ | 315/324 |
| 5,458,048 A * | 10/1995 | Hohner | ............................ | 91/459 |
| 5,884,664 A * | 3/1999 | Nagai et al. | .................... | 137/884 |
| 6,204,939 B1 | 3/2001 | Lin et al. | | |
| 6,507,159 B2 * | 1/2003 | Muthu | ............................ | 315/307 |
| 6,576,881 B2 * | 6/2003 | Muthu et al. | ................... | 250/205 |
| 6,924,908 B1 * | 8/2005 | Kimia | ............................. | 358/1.9 |
| 7,140,752 B2 * | 11/2006 | Ashdown | ..................... | 362/276 |

(Continued)

FOREIGN PATENT DOCUMENTS

EP    0611231 A1    8/1994

(Continued)

*Primary Examiner* — Haissa Philogene

(57) ABSTRACT

A method, for controlling color output of a variable color lighting system (1) capable of emitting light within a color gamut, comprising the steps of receiving (10) a request for a target color (T), converting the target color (T) to a set of lighting system control parameters, and applying (15) the set of lighting system control parameters, thereby controlling the color output of the lighting system (1). The step of converting comprises the steps of determining (11) a target set (DT) of lighting system control parameters corresponding to the target color (T), evaluating (12) the target set (D$\tau$) of lighting system control parameters with respect to a range of allowable control parameters, thereby determining whether the target color (T) is outside the color gamut, and, when the target color (T) is outside the color gamut, determining (14) an approximation set (DA) of control parameters, the approximation set corresponding to an output color (A1; A2) within the color gamut, the output color (A1; A2) being an approximation of the target color (T).

18 Claims, 3 Drawing Sheets

U.S. PATENT DOCUMENTS

| | | | |
|---|---|---|---|
| 7,364,306 B2 * | 4/2008 | Margulis | 353/31 |
| 7,710,369 B2 * | 5/2010 | Dowling | 345/83 |
| 2003/0111533 A1 | 6/2003 | Chang | |
| 2005/0047134 A1 | 3/2005 | Mueller et al. | |
| 2005/0174473 A1 * | 8/2005 | Morgan et al. | 348/370 |

FOREIGN PATENT DOCUMENTS

| | | |
|---|---|---|
| EP | 1067825 A2 | 1/2001 |
| WO | 02080625 A1 | 10/2002 |
| WO | 02082863 A1 | 10/2002 |

* cited by examiner

METHOD AND SYSTEM FOR VARIABLE COLOR LIGHTING

FIELD OF THE INVENTION

The present invention relates to a variable color lighting system and a method and a controller for controlling color output of such a variable color lighting system. The invention further relates to a lighting network comprising a plurality of lighting systems.

BACKGROUND OF THE INVENTION

A current trend in lighting is that light is more and more used for creating an atmosphere rather than for simple illumination. Lighting solutions suitable as "atmosphere providers" need to be capable of emitting light of different colors as well as being variable in intensity (dimmable). Ideally, such lighting solutions should be variable over the entire color triangle (for example in the xy-plane of the CIE XYZ-system) perceptible by a human eye. In reality, however, a color variable lighting solution can span only a part of the color triangle. For a particular color variable lighting solution, this part of the color triangle is referred to as the color gamut of the lighting solution. Moreover, different lighting solutions generally have different color gamuts.

U.S. Pat. No. 5,384,519 discloses an example of such a variable color lighting arrangement in which light from at least three dimmable mono-color light sources is mixed in order to emit light of a desired color.

Since the color gamut of any variable color lighting solution only spans a part of the color triangle, there is always a possibility that a user may request light of a color outside the color gamut of the lighting solution. Furthermore, the variable color lighting system may, at a given time, be unable to emit light of a color, which is within the specified color gamut. This may happen due to variations over time, temperature etc in the light-sources comprised in the lighting system.

There is thus a need for an improved variable color lighting system which is capable of handling requested out-of-gamut color points in a satisfactory way.

SUMMARY OF THE INVENTION

In view of the above-mentioned and other drawbacks of the prior art, a general object of the present invention is to provide an improved variable color lighting system.

A further object of the present invention is to enable handling of a requested color outside a color gamut of a variable color lighting system.

According to a first aspect of the invention, these and other objects are achieved through a method, for controlling color output of a variable color lighting system capable of emitting light within a color gamut, comprising the steps of receiving a request for a target color, converting the target color to a set of lighting system control parameters, and applying the set of lighting system control parameters, thereby controlling the color output of the lighting system. The step of converting comprises the steps of determining a target set of lighting system control parameters corresponding to the target color, evaluating the target set of lighting system control parameters with respect to a range of allowable control parameters, thereby determining whether the target color is within the color gamut, and, when the target color is outside the color gamut, determining an approximation set of control parameters, the approximation set corresponding to an output color within the color gamut, the output color being an approximation of the target color.

A certain point (x, y, z) in color space is related to lighting system control parameters ($D_1$-$D_n$) according to the following relation for n light-sources:

$$\begin{bmatrix} x \\ y \\ z \end{bmatrix} = \begin{bmatrix} b_{11} & \cdots & b_{1n} \\ & \vdots & \\ & & b_{3n} \end{bmatrix} \cdot \begin{bmatrix} D_1 \\ \vdots \\ D_n \end{bmatrix}$$

where the 3xn-matrix contains lighting device specific information linking the light-sources to chromaticity co-ordinates.

In the context of this application, "a range of allowable control parameters" should be understood as a range of control parameters determined by limitations set by lighting devices comprised in the lighting system.

Through the method according to the present invention, a target set of lighting system control parameters is actively evaluated in order to determine whether the target set corresponds to a target color within the color gamut of the variable color lighting system. Furthermore, if the requested target color point is found to be located outside the color gamut of the lighting system, an approximation set of control parameters is determined. Thereby, an approximation of a requested color outside the color gamut can be emitted by the variable color lighting system.

Through the method according to the present invention, a requested color outside the color gamut may be approximated such that a user is most of the time unaware that an out-of-gamut color had been requested. Such a result would be unlikely to obtain by merely passively allowing a lighting device comprised in the lighting system to saturate when a color request is received, which corresponds to an output unreachable by the lighting device.

The method according to the invention further enables detection of requested color points, which are "impossible", that is, outside the color triangle in the xy-plane.

Furthermore, the method according to the invention enables handling of changes in the color gamut due to properties of the light-sources and other functional parts of the lighting system changing over time or due to changes in environmental factors, such as temperature.

This functionality may, for example, be implemented through including one or several sensors, such as a temperature sensor, in the lighting system and adapting a controller comprised in the lighting system for calculating a new color gamut following changes in environmental and other parameters and/or after passing of a certain time.

The step of determining an approximation set may comprise the steps of selecting a correction set of lighting system control parameters corresponding to a color within the color gamut of the lighting system, and forming the approximation set by combining the target set with the correction set multiplied by a correction factor.

Through the above-described approach, an approximation of the requested target color can be accomplished following suitable selection of a correction color point within the color gamut of the lighting system and a simple calculation. The correction color point may be a universal color point used for all approximations or it may be selected depending on the location of the requested target color point.

The approximation set may preferably be formed according to the following relation:

$$D_A = D_T + a^* D_C;$$

where $D_A$ is the approximation set, $D_T$ is the target set, $D_C$ is the correction set, and a is the correction factor.

Each set of control parameters may correspond to a set of duty cycles for at least three light-sources comprised in the lighting system A duty cycle range of 0-100% covers all the available output intensities for a particular light-source. A certain duty cycle may, for example, be realized through supplying a corresponding amount of power to the light-source or through rapidly switching the light source between "off"- and "on"-states such that the relative time in the "on"-state corresponds to the duty cycle.

In this case, a target color outside the available color gamut may be indicated by at least one of the duty cycles comprised in the target set having a negative value.

Since a light-source is clearly unable to operate at a negative duty cycle, it may hereby easily and without unnecessary calculations be determined whether the requested target color point is outside the color gamut.

The above-mentioned correction factor may be determined such that all of the duty cycles comprised in the approximation set become greater than or equal to zero.

Through this approach, it is guaranteed that the approximation set corresponds to a color within the available color gamut.

Preferably, the correction factor is determined such that the light-source that had the most negative target duty-cycle is assigned a duty cycle of 0%. Thereby, the approximation color point is positioned on the edge of the available color gamut and on a line in color space between the target color point and the correction color point. A good approximation of the requested target color is hereby obtained.

The correction set may correspond to a white point on a blackbody curve.

By selecting the correction set in this way, the target color is effectively de-saturated towards the white point. In this manner, an approximate output color, which may be perceived as the target color, is obtained.

Alternatively, the correction set may be the unity vector.

As understood by one skilled in the art, several other suitable correction sets exist. Such suitable correction sets may, for example, correspond to a daylight illuminant, such as any one of D50, D55, D65 and D75, or illuminant A through D.

According to one embodiment, the method of the present invention may further comprise the step of transmitting to at least a second lighting system, if the target color is outside the color gamut, an out-of-gamut warning, and color co-ordinates representing the output color.

Variable color lighting systems may be realized by a great variety of different light-sources. Such light-sources include LEDs, filtered halogen lamps and colored fluorescent lamps. A number of lighting systems may be interconnected to form a lighting network, and the lighting systems forming this network may have different color gamuts. If one of these lighting systems would receive a request for an out-of-gamut target color point, it would, according to the present invention, warn the other lighting systems on the network and possibly also transmit color co-ordinates for the approximate output color determined by that lighting system. This transmission enables the other lighting systems to respond in a similar way to the particular target color request so that a user does not obtain different outputs from the different lighting systems in the lighting network as a result of the same request.

According to a second aspect of the invention, the above-mentioned and other objects are achieved by a controller for controlling color output of a variable color lighting system comprising at least two lighting devices, the controller being configured to receive a request for a target color, convert the target color to a set of lighting system control parameters, and apply the set of lighting system control parameters to the lighting devices, thereby controlling the color output of the lighting system, wherein the controller is further configured to determine a target set of lighting system control parameters corresponding to the target color, evaluate the target set of lighting system control parameters with respect to a range of allowable control parameters, thereby determining whether the target color is outside the color gamut, and, when the target color is outside the color gamut, determine an approximation set of control parameters, the approximation set corresponding to an output color inside the color gamut, the output color being an approximation of the target color.

Further effects obtained through this second aspect of the present invention are largely analogous to those described above in connection with the first aspect of the invention.

According to a third aspect of the invention, the above-mentioned and other objects are achieved by a variable color lighting system capable of emitting light within a color gamut, comprising at least two lighting devices, each arranged to controllably emit light of a primary color, and a controller according to the present invention.

According to a fourth aspect of the invention, the above-mentioned and other objects are achieved by a lighting network comprising a plurality of variable color lighting systems according the present invention, wherein the variable color lighting systems are arranged to communicate over this lighting network.

According to a fifth aspect of the invention, the above-mentioned an other objects are achieved by a computer program module adapted to run on a controller in a variable color lighting system to perform the steps of claim 1.

BRIEF DESCRIPTION OF THE DRAWINGS

For exemplifying purposes, these and other aspects of the present invention will now be described in more detail, with reference to the appended drawings showing a currently preferred embodiment of the invention, wherein.

DETAILED DESCRIPTION OF THE PREFERRED EMBODIMENT

In the following description, the present invention is described with reference to a stand-alone variable color lighting system comprising three narrow-banded light-sources. It should be noted that this by no means limits the scope of the invention, which is equally applicable to lighting systems configured in a variety of other ways, such as being comprised of a number of physically separated devices, having a smaller or larger number of narrow-banded light-sources or including one or several wide-banded light-sources. For example, the variable color lighting system may be comprised of a master controller, which may be provided in the form of a computer, receiving color requests from a user and converting these requests to lighting system control parameters, which are then sent to remotely located lighting devices. The control parameters may be sent by wire or wirelessly.

Figure 1:
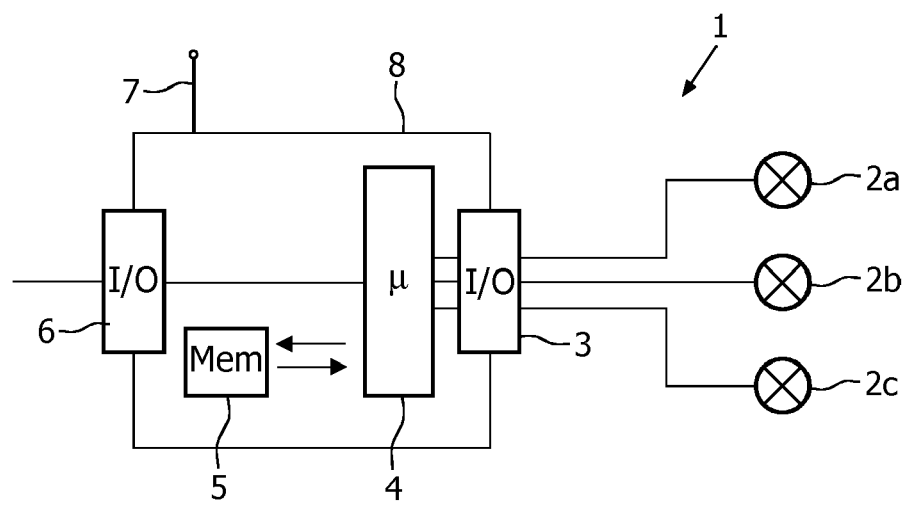
FIG. 1 schematically shows a block diagram illustrating a preferred embodiment of the variable color lighting system according to the present invention.

In FIG. 1, a block diagram representation of a preferred embodiment of the variable color lighting system according to the present invention is schematically shown.

Referring to FIG. 1, a variable color lighting system 1 is shown, comprising three narrow-banded, essentially mono-color light-sources 2a-c, a light-source interface 3, a controller 8, including a micro-processor 4, a memory 5, such as a RAM or a non-volatile memory, and an external interface 6. The exemplary lighting system 1 is powered via an external power connection 7. Of course, an internal power supply, such as a battery, could also be used.

The micro-processor 4 receives output color requests via the external interface 6 and, following processing, forwards the request to the light sources 2a-c via the light-source interface 3.

The light-sources 2a-c are intensity controllable (dimmable) and may be controlled to output light of their respective colors at relative intensities, or duty-cycles, from 0% to 100%.

Output color requests may, for example, be received in the form of chromaticity co-ordinates in a color space, such as the CIE XYZ-color space. These color co-ordinates are converted to lighting system control parameters, in the present example duty cycles, in principle by means of performing a calculation according to the following relation:

$$\begin{bmatrix} D_1 \\ D_2 \\ D_3 \end{bmatrix} = \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} T_x \\ T_y \\ T_z \end{bmatrix},$$

where $D_{1-3}$ are duty cycles for the three light-sources 2a-c, $T_{x-z}$ are chromaticity co-ordinates for the target color and $a_{11}$-$a_{33}$ represent lighting system specific information for conversion between chromaticity co-ordinates and light-source duty-cycles.

The values $a_{11-33}$, defining the color gamut of the lighting system, may be stored in the memory 5 and duty-cycles may be calculated in the microprocessor 4 for each requested color. Alternatively, the memory 5 may contain a look-up table with a number of corresponding color co-ordinates and duty-cycles. For a requested color not directly represented in the look-up table, the microprocessor 4 may interpolate between stored values in order to obtain duty-cycles corresponding to the requested color within the color gamut.

Figure 2:
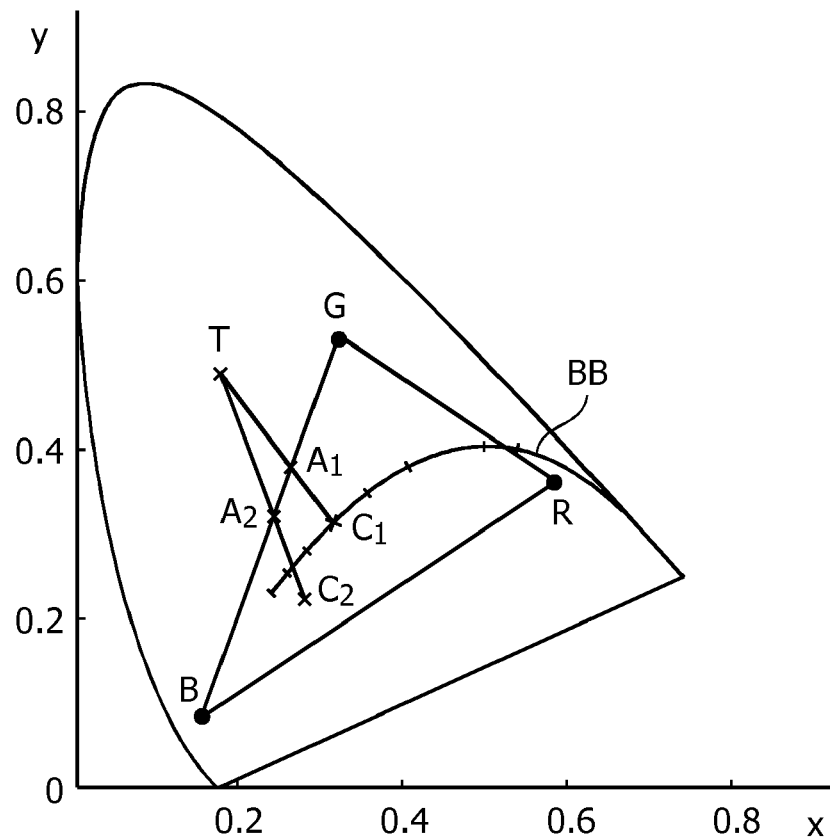
FIG. 2 illustrates, in the xy-plane of the CIE XYZ-color space, two examples of relations between target color points and approximation color points obtained through the method according to the present invention.

In FIG. 2, a projection in the xy-plane is shown of a section of the XYZ-color space representing visible colors. This projection is generally referred to as the xy-representation of color space.

Referring now to FIGS. 1 and 2, exemplary color points R, G, B, representing the primary color output from light-sources 2a, b, c, respectively are plotted in the xy-plane. The points R, G, B together define a triangle within which, in principle, all color points may be rendered using the three controllable light-sources 2a-c. The area defined by this triangle in the xy-plane is called the color gamut of the lighting system.

In FIG. 2, a blackbody curve BB, representing emission from a blackbody radiator at different temperatures is shown.

Furthermore, a requested target color point T outside the color gamut is shown together with approximate output color points $A_1$, $A_2$ and correction color points $C_1$, $C_2$. The handling of a requested target color point T outside the color gamut will be described below with reference to FIGS. 3 and 4.

Figure 3:
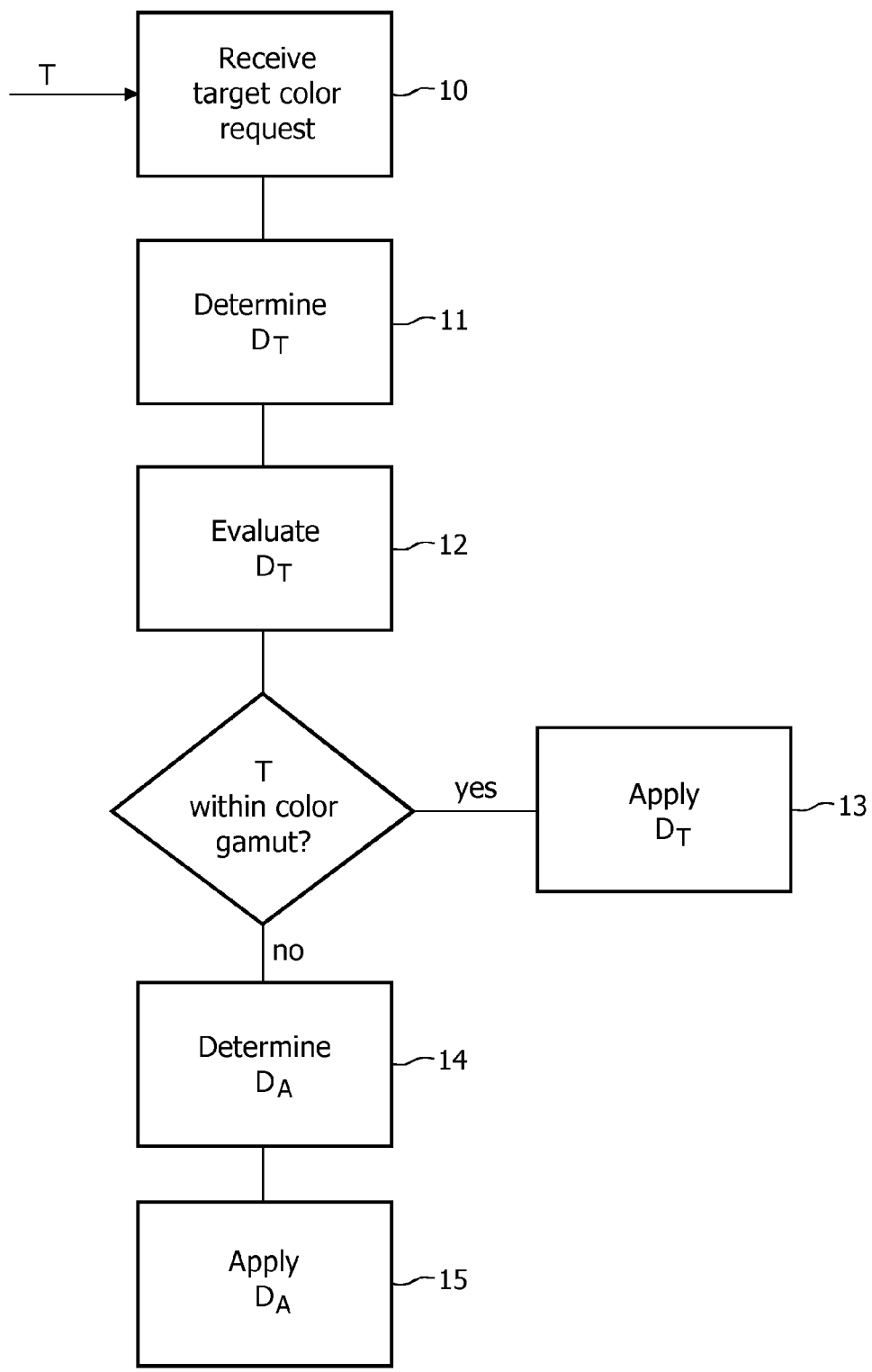
FIG. 3 is a schematic flow-chart, illustrating the method according to the present invention.

In FIG. 3, which is a schematic flow-chart illustrating the method of the invention, a request for a target color T is received in a first step 10. In a subsequent step 111, a target set $D_T$ of lighting system control parameters is determined. In a following step 12, this target set is evaluated with respect to a range of allowable control parameters. With reference to the exemplary lighting control system shown in FIG. 2 and described above, this range is preferably the 0-100% range of the duty cycles of the light-sources 2a-c.

If the target set $D_T$ is within the allowable range of control parameters, the target color T is within the color gamut of the lighting system and can consequently be rendered by the lighting system. This is done by applying the target set $D_T$ to the lighting system (step 13), which in the exemplary system of FIG. 2 may be done by applying power corresponding to the duty cycles directly to the light-sources.

If, on the other hand, the target set $D_T$ is found to be outside the allowable range of control parameters, in the exemplary system of FIG. 2 typically corresponding to exhibiting one or more duty cycles having a negative value, the process moves on to a step 14 of determining an approximation set $D_A$ of lighting system control parameters. This approximation set $D_A$ corresponds to an output color A within the color gamut, the output color A being an approximation of the requested out-of-gamut target color T. Subsequently, this approximation set $D_A$ is applied 15 to the lighting system and the output color A is emitted by the lighting system, thereby presenting to a user an approximation of the requested out-of-gamut target color T.

Figure 4:
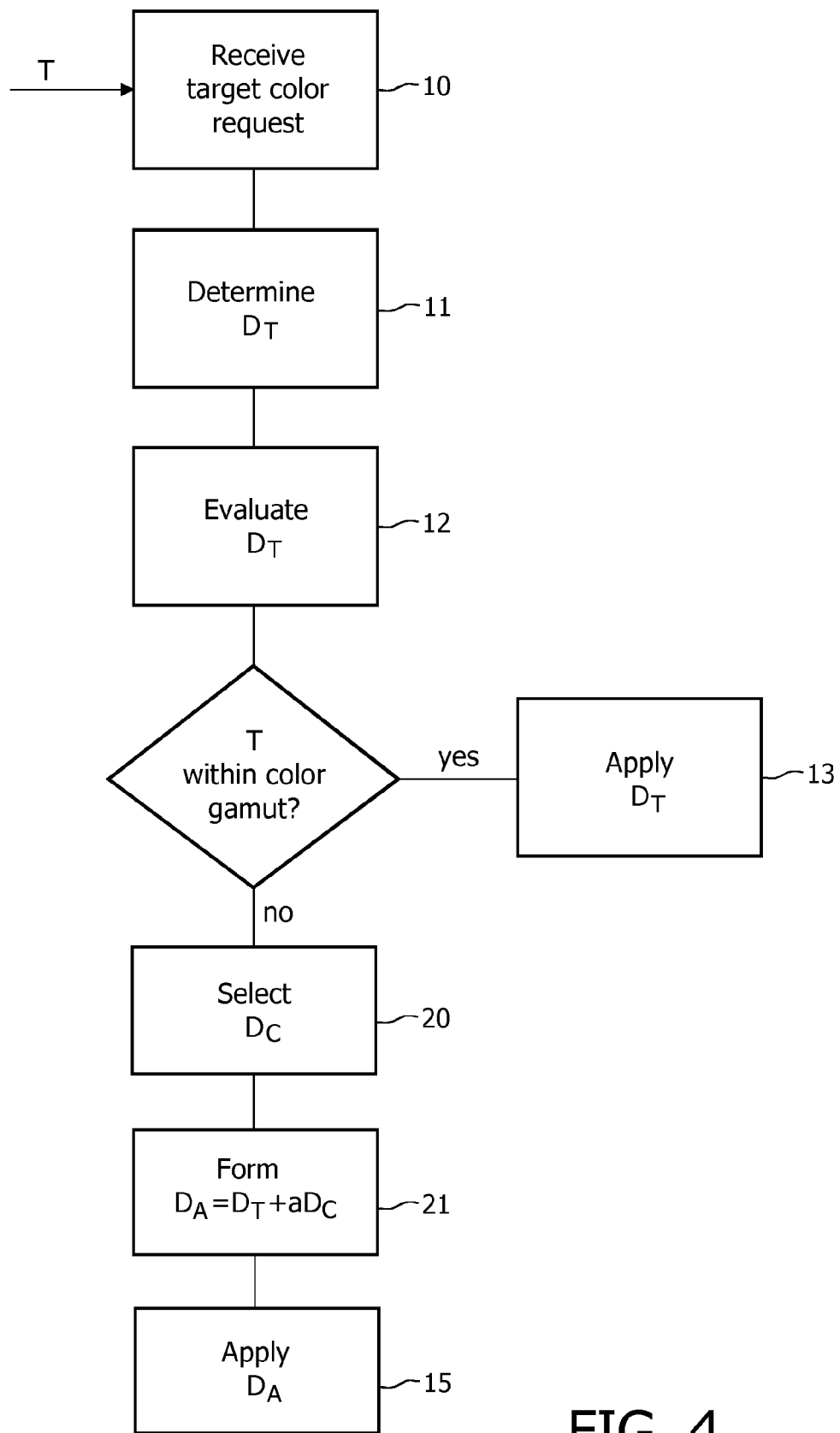
FIG. 4 is a schematic flow-chart, illustrating a preferred embodiment of the method according to the present invention.

FIG. 4, which is a flow-chart schematically illustrating a preferred embodiment of the method according to the invention, differs from FIG. 3 in that the step 14 in FIG. 3 of determining the approximation set $D_A$ has been replaced by the steps 20 and 21 of selecting a correction set $D_C$ of lighting system control parameters and forming an approximation set $D_A$ of lighting system control parameters using this correction set $D_C$.

In the step 20 of selecting a correction set $D_C$, control parameters corresponding to a suitable color point C are selected. Such a suitable color point C may, with reference here to FIG. 2, for example, be a white point $C_1$ on the blackbody curve BB or a point $C_2$ of equal control parameters, such as equal duty cycles. $C_2$ is thus the output color obtained by applying, for example, 100% duty cycle to all light-sources 2a-c in the exemplary lighting system 1 of FIG. 1.

When determining the approximation set $D_A$ of control parameters, the following relation is used:

$$\begin{bmatrix} D_{A,R} \\ D_{A,G} \\ D_{A,B} \end{bmatrix} = \begin{bmatrix} D_{T,R} \\ D_{T,G} \\ D_{T,B} \end{bmatrix} + a * \begin{bmatrix} D_{C,R} \\ D_{C,G} \\ D_{C,B} \end{bmatrix}$$

Assuming now that the target duty cycle $D_{T,R}$ for the red light-source 2a is negative and that we want to position the approximation color point A on the edge of the color gamut. The approximation duty cycle $D_{A,R}$ for the red light-source 2a should become zero. This gives us the following relation for the coefficient a:

$$a = -D_{T,R}/D_{C,R}$$

According to a first example of the preferred embodiment of the method according to the present invention, the correction set $D_{C1}$ corresponds to a white point $C_1$ on the blackbody curve BB at, for example, 4000 K. The coefficient a then becomes:

$$a=-D_{T,R}/D_{C1,R}.$$

According to a second example, the correction set $D_{C2}$ corresponds to a point $C_2$ of equal duty cycles. The correction set $D_{C2}$ then becomes a unity vector and the coefficient a becomes:

$$a=-D_{T,R}$$

The person skilled in the art realizes that the present invention by no means is limited to the preferred embodiments described above. On the contrary, many modifications and variations are possible within the scope of the appended claims. For example, there are other suitable control parameters than the above-described duty cycles. Such control parameters may include voltage, current, power and other parameters usable to control the output of light-sources in a variable color lighting system.

The invention claimed is:

1. A method, for controlling color output of a variable color lighting system capable of emitting light within a color gamut, comprising the steps of:
   receiving a request for a target color;
   converting said target color to a set of lighting system control parameters; and
   applying said set of lighting system control parameters, thereby controlling the color output of said lighting system, characterized in that said step of converting comprises the steps of:
   determining a target set of lighting system control parameters corresponding to said target color;
   evaluating said target set of lighting system control parameters with respect to a range of allowable control parameters, thereby determining whether said target color is outside said color gamut; and
   when said target color is outside said color gamut, determining an approximation set of control parameters, said approximation set corresponding to an output color ($A_1$; $A_2$) within said color gamut, said output color being an approximation of said target color.

2. A method according to claim 1, wherein said step of determining an approximation set comprises the steps of:
   selecting a correction set of lighting system control parameters corresponding to a color within said color gamut; and
   forming said approximation set by combining said target set with said correction set multiplied by a correction factor.

3. A method according to claim 2, wherein said approximation set is formed according to the following relation:

$$D_A=D_T+a*D_C;$$

where $D_A$ is the approximation set, is the target set, is the correction set, and a is the correction factor.

4. A method according to claim 2, wherein each set of said control parameters corresponds to a set of duty cycles for at least three light-sources comprised in said lighting system.

5. A method according to claim 4, wherein a target color (T) outside said color gamut is indicated by at least one of said duty cycles comprised in said target set ($D_T$) having a negative value.

6. A method according to claim 4 or 5, wherein said correction factor (a) is determined such that all of the duty cycles comprised in said approximation set become greater than or equal to zero.

7. A method according to claim 2, wherein said correction set corresponds to a white point on a blackbody curve.

8. A method according to claim 2, wherein said correction set is a unity vector.

9. A method according to claim 1, further comprising the step of:
   transmitting, to at least a second lighting system, an out-of-gamut warning.

10. A method according to claim 9, further comprising the step of:
    transmitting, to said at least second lighting system, color co-ordinates representing said output color.

11. A computer program module adapted to run on a controller in a variable color lighting system to perform the steps of claim 1.

12. A controller, for controlling color output of a variable color lighting system comprising at least two lighting devices, said controller being configured to:
    receive a request for a target color;
    convert said target color to a set of lighting system control parameters; and
    apply said set of lighting system control parameters to said lighting devices, thereby controlling the color output of said lighting system,
    characterized in that said controller is further configured to:
    determine a target set of lighting system control parameters corresponding to said target color;
    evaluate said target set of lighting system control parameters with respect to a range of allowable control parameters, thereby determining whether said target color is outside a color gamut; and
    when said target color is outside said color gamut, determine an approximation set of control parameters, said approximation set corresponding to an output color inside said color gamut, said output color being an approximation of said target color.

13. A controller according to claim 12, wherein said controller is further adapted to:
    select a correction set of lighting system control parameters corresponding to a color within said color gamut; and
    form said approximation set by combining said target set with said correction set multiplied by a correction factor.

14. A controller according to claim 12, wherein the controller is further configured to transmit, to at least a second lighting system, an out-of-gamut warning.

15. A controller according to claim 14, wherein the controller is further configured to transmit, to said at least second lighting system, color co-ordinates representing said output color.

16. A variable color lighting system capable of emitting light within a color gamut, comprising:
    at least two lighting devices, each arranged to controllably emit light of a primary color; and
    a controller according to claim 12.

17. A lighting network comprising a plurality of variable color lighting systems according to claim 16, said variable color lighting systems being arranged to communicate over said lighting network.

18. A controller according to claim 13, wherein the controller is adapted to form said approximation set according to the following relation:

$$D_A=D_T+a*D_C;$$

where $D_A$ is the approximation set, $D_T$ is the target set, $D_C$ is the correction set, and a is the correction factor.

* * * * *